(12) United States Patent
Rolland et al.

(10) Patent No.: US 9,964,444 B2
(45) Date of Patent: May 8, 2018

(54) IMAGING SPECTROMETER DESIGN TOOL FOR EVALUATING FREEFORM OPTICS

(71) Applicants: Jannick P. Rolland, Pittsford, NY (US); Jacob Reimers, Homestead, FL (US)

(72) Inventors: Jannick P. Rolland, Pittsford, NY (US); Jacob Reimers, Homestead, FL (US)

(73) Assignee: UNIVERSITY OF ROCHESTER, Rochester, NY (US)

( * ) Notice: Subject to any disclaimer, the term of this patent is extended or adjusted under 35 U.S.C. 154(b) by 26 days.

(21) Appl. No.: 15/168,015

(22) Filed: May 28, 2016

(65) Prior Publication Data

US 2016/0350952 A1 Dec. 1, 2016

Related U.S. Application Data

(60) Provisional application No. 62/167,778, filed on May 28, 2015.

(51) Int. Cl.
*G06T 11/20* (2006.01)
*G01J 3/28* (2006.01)

(52) U.S. Cl.
CPC .................................. *G01J 3/2823* (2013.01)

(58) Field of Classification Search
CPC .......... G02B 2027/011; G02B 27/4216; G02B 27/0012; A61B 3/1015; G01N 21/4795;
(Continued)

(56) References Cited

U.S. PATENT DOCUMENTS 5,880,834 A 3/1999 Chrisp
8,416,407 B2 4/2013 Cook
(Continued)

FOREIGN PATENT DOCUMENTS

CN 103900688 A 7/2014
CN 103175611 B 2/2015

OTHER PUBLICATIONS

Fuerschbach, Kyle, Jannick P. Rolland, and Kevin P. Thompson. "A new family of optical systems employing ψ-polynomial surfaces." Optics express 19.22 (2011): 21919-21928.*
Fuerschbach, Kyle H., Kevin P. Thompson, and Jannick P. Rolland. "A new generation of optical systems with ψ-polynomial surfaces." International Optical Design Conference 2010. International Society for Optics and Photonics, 2010.*
(Continued)

*Primary Examiner* — Sultana M Zalalee
(74) *Attorney, Agent, or Firm* — Thomas B. Ryan; Harter Secrest & Emery LLP

(57) ABSTRACT

A full-field display for spectrally dispersive imaging optics, particularly as a design tool for evaluating optical designs including designs with freeform optical surfaces, includes a ray tracing module arranged for modeling local aberrations throughout the image field of the spectrometer and a display module that converts values of the modeled local aberrations throughout the image field into representative symbols. The spectrometer field has a first spatial dimension corresponding to a length dimension of an input and a second spectral dimension corresponding to the dispersion of the input. The representative symbols are plotted in an array having a first axis corresponding to the first spatial dimension of the image field and a second axis corresponding to the second spectral dimension of the image field.

20 Claims, 5 Drawing Sheets

(58) Field of Classification Search
CPC ....... G01N 2021/1782; G01N 21/6402; G01N 21/6456
See application file for complete search history.

(56) References Cited

U.S. PATENT DOCUMENTS

| | | |
|---|---|---|
| 8,616,712 B2 | 12/2013 | Rolland et al. |
| 8,873,049 B2 | 10/2014 | Rolland et al. |
| 2005/0134844 A1 | 6/2005 | Cook |
| 2011/0222061 A1* | 9/2011 | Desserouer ............ G01J 3/1838 356/328 |
| 2012/0243114 A1* | 9/2012 | Rolland ............... G01M 11/025 359/858 |

OTHER PUBLICATIONS

Xu et al., "Design of Freeform Mirrors in Czerny-Turner Spectrometers to Suppress Astigmatism," Applied Optics, vol. 48, No. 15, May 20, 2009, pp. 2871-2879.

Reimers et al., "Spectral Full-Field Displays for Spectrometers," International Optical Design Conference 2014, Proc. of SPIE-OSA vol. 9293, 9293O, 2014.

Hullin et al., "Polynomial Optics: A Construction Kit for Efficient Ray-Tracing of Lens Systems," Eurographics Symposium on Rendering 2012, vol. 31, No. 4, 2012.

Lerner, "Imaging Spectrometer Fundamentals for Researchers in the Biosciences—A Tutorial," 2006 International Society for Analytical Cytology, Cytometry Part A 69A:712-734, 2006.

\* cited by examiner

IMAGING SPECTROMETER DESIGN TOOL FOR EVALUATING FREEFORM OPTICS

This invention was made with government support under IIP1338877 awarded by the National Science Foundation. The government has certain rights in the invention.

TECHNICAL FIELD

Features relate to the display of modeled optical aberrations particularly in the form of full field displays for spectrometers in which both spatial and spectral dimensions are represented.

BACKGROUND

Calculated aberrations provide useful characterizations of optical system designs. The visualization of particular aberrations over the field of view of optical systems can provide a guide for evaluating and comparing optical system designs. The criticality of different aberrations can vary in accordance with the performance objectives for different types of optical system designs. The effects of changes to the geometry or surface topography of optical surfaces of the optical systems, for example, can be variously reflected in the changes to particular aberrations throughout the modeled optical field.

The emergence of freeform surfaces in imaging optical systems has driven the development of new fabrication methods and mathematical descriptions of surface topography. For example, the introduction of freeform surfaces into optical design has led to the use of nodal aberration theory (NAT) to describe the aberration fields of optical systems that are not constrained to be rotationally symmetric. Full field displays plotting aberrations by type such as wave aberration coefficients, or Zernike polynomial coefficients term-by-term, or summary measures of image quality such as root mean square wavefront error over two spatial dimensions have been used to provide optical designers with insight into the nodal structure of aberrations. The combination of nodal aberration theory and full field displays have been used for evaluating imaging optical designs using rotationally nonsymmetric optical components including freeform surfaces to provide a visual aid for observing the field dependent nodal behavior that appears when the system symmetry is broken.

SUMMARY

Certain embodiments extend the ability to evaluate rotationally nonsymmetric optical systems to spectrometers using a full field display having both spatial and spectral dimensions. For example, although traditional slit-based laboratory or astronomical spectrometer systems collect light for imaging along a single axis, the intended spectral dispersion of the light also results in the imaging of the light across a spectral dimension.

Based on a given spectrometer design, real ray trace calculations can be used to calculate the magnitude and orientation of aberration terms (when the latter applies), such as Zernike wavefront decompositions, within a full field of view for the spectrometer in which one axis of the field corresponds to the spatial dimension over which the light is collected such as the slit length or field-of-view (FOV) and an orthogonal axis of the field corresponds to a spectral dimension over which the light is dispersed. The new visualization can display both the magnitude and orientation of the aberrations by type such as wave aberration coefficients or Zernike polynomial terms fit to the wavefront decomposition, or a summary measure of image quality such as the RMS wavefront error as a function of wavelength for a slit FOV. A two-dimensional field plot can be calculated on a term-by-term basis to afford the optical designer insight into the nodal structure of aberrations for spectrometers— particularly once the system design breaks symmetry.

As a new tool for the optical designer's "arsenal," a full-field display in spatial and spectral dimensions as described herein, and referred hereinafter as a Spectral Full Field Display (SFFD), can contribute to iteratively designing, evaluating performance, and leveraging the optimization space of freeform spectrometers. This comprehensive display can drive the selection, complexity, and overall form of the freeform surfaces. With the visualization provided by the SFFD combined with the knowledge of aberration field symmetries provided by nodal aberration theory (NAT), the designer can adjust both the geometry and the surface topography (freeform surfaces, if need be) while exploring the aberration limitations of a specific optical design solution space.

A version, as a SFFD for spectrometers having optical systems for imaging and spectrally dispersing an input over a plurality of spatially displaced positions in an image field, features both a ray tracing module and a display module. The ray tracing module is arranged for modeling local aberrations or summary metric of the aberrations throughout the image field of the spectrometer having a first spatial dimension corresponding to a length dimension of the input and a second spectral dimension corresponding to the dispersion of the input. The display module converts values of the modeled local or summary metric of the aberrations throughout the image field into representative symbols and plots the representative symbols in an array having a first axis corresponding to the first spatial dimension of the image field and a second axis corresponding to the second spectral dimension of the image field.

The values of the modeled local or summary metric of the aberrations can include calculated values for individual aberration terms, such as defocus, astigmatism, coma, or spherical aberration as well as root mean square wavefront errors. The exemplary display module plots separate arrays of representative symbols for the calculated values of each of a plurality of different aberration terms. The calculated values of at least one of the aberration terms (e.g., astigmatism or coma) can include values for both magnitude and orientation of the modeled local aberrations (when the latter applies), and the representative symbols provide visual indications of both the magnitudes and orientations of the modeled local aberrations throughout the image field (when the latter applies).

Another version, as a method of displaying aberrations in the image field of an optical system for imaging and spectrally dispersing an input over a plurality of spatially displaced positions in the image field, models local aberrations or summary metric of the aberrations of the optical system throughout the image field having a first spatial dimension corresponding to a length dimension of the input and a second spectral dimension corresponding to the dispersion of the input. The values of the modeled local aberrations or summary metric of the aberrations throughout the image field are converted into representative symbols, and the representative symbols are plotted in an array having a first axis corresponding to the first spatial dimension of the image field and a second axis corresponding to the second spectral dimension of the image field.

The values of one or more individual aberration terms can be calculated at a plurality of positions throughout the image field. Zernike wavefront decompositions can be used for estimating local aberrations throughout the image field. At least one of the individual aberration terms subject to plotting can include values for both magnitude and orientation of the modeled local aberrations. The representative symbols can provide visual indications of both the magnitudes and orientations of the modeled local aberrations. Alternatively, the calculated values for one of the individual aberration terms can represent root mean square wavefront errors.

BRIEF DESCRIPTIONS OF THE DRAWING FIGURES

DETAILED DESCRIPTION

Figure 1:
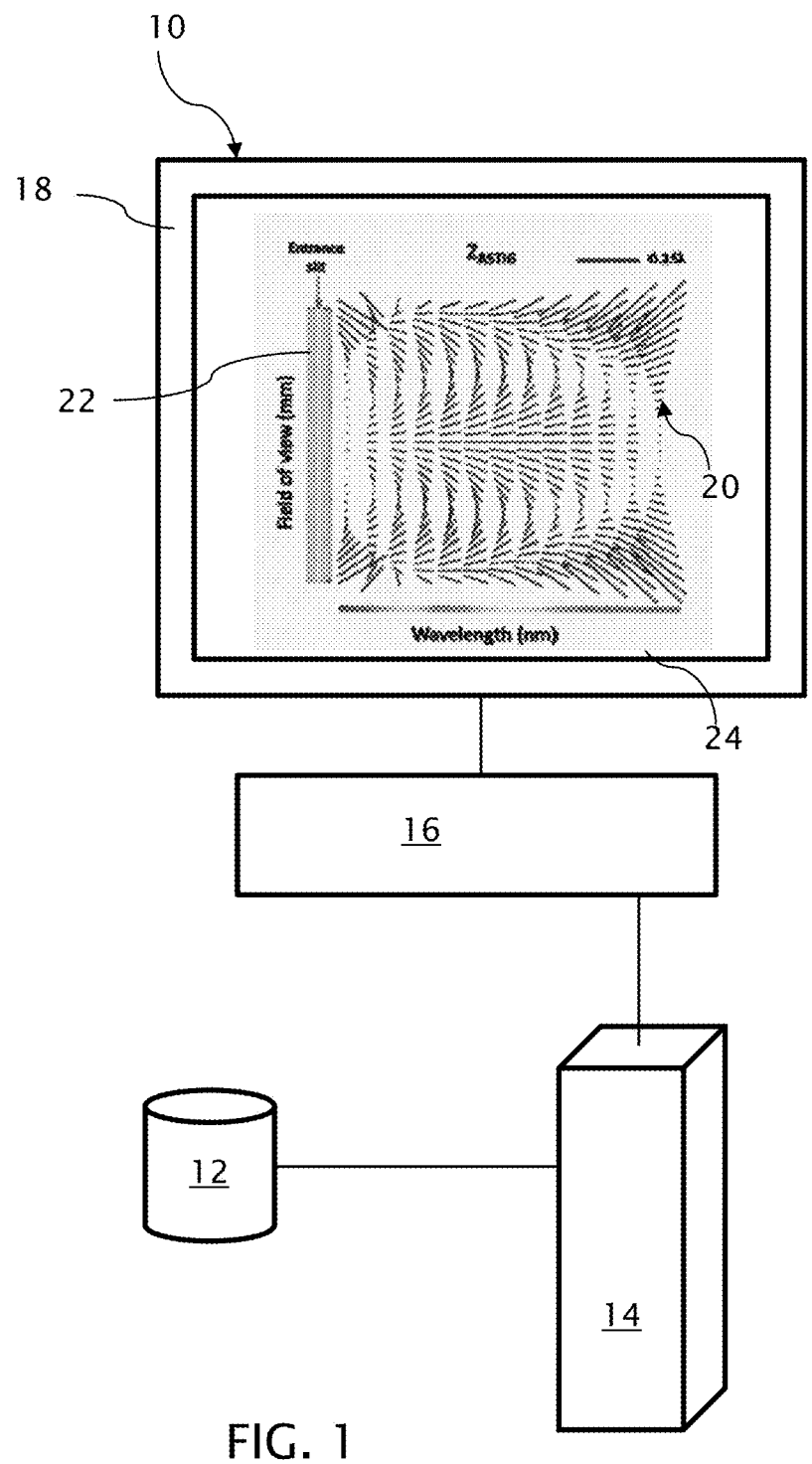
FIG. 1 is a diagram of a design tool in accordance with an embodiment.

A design tool 10 for dispersive optical systems, particularly imaging spectrometers, as shown in FIG. 1, includes a data storage 12 housing one or more optical designs. The designs can include definitions of full optical systems or definitions of individual components or groupings of components within such systems. A module 14, including a processor with a ray tracing algorithm such as, but not limited to, Zemax® software from Zemax, LLC of Redmond, Wash. or CODE V® optical design software from Synopsys, Inc. of Pasadena, Calif., receives an optical design specification from the data storage 12 and calculates individual aberrations within a spatial and spectral field of view. The individual aberrations can be acquired in the form of polynomial expressions such as Zernike polynomials, as a polynomial fit to the wavefront of real ray tracing solutions. For example, Zernike coefficients can be generated from real ray tracing by calculating the optical path difference (OPD) for each ray with respect to the corresponding real chief ray for constructing an optical path difference (OPD) map and then fitting Zernike polynomials to the OPD map.

A module 16, also with access to a processor, includes a display driver for displaying information on a display 18. The display module 16 converts values of the modeled local aberrations throughout the image field (i.e., the spectral field of view) into representative symbols 20 and plots the representative symbols 20 in an array having a first axis 22 corresponding to the first (spatial) dimension of the image field and a second axis 24 corresponding to the second (spectral) dimension of the image field. The calculated values for a particular modeled local aberration can include values for both magnitude and orientation of the modeled local aberration. The representative symbols 20 generated by the display module 16 can provide visual indications of both the magnitudes and orientations of the modeled local aberration throughout the image field. By way of example for Zernike astigmatism ($Z_{ASTIG}$), the representative symbols 20 shown in FIG. 1 are lines having respective lengths corresponding to the magnitudes of the local aberrations and respective orientations corresponding to the orientations of the local aberrations in the depicted image field.

The plotted individual aberrations can correspond to well-known aberrations such as defocus, astigmatism, coma, and spherical aberration captured in a recognized mathematical form such as in Zernike polynomial terms. The calculated values for one or more individual aberration terms can also be expressed as root mean square wavefront errors.

Figure 2:
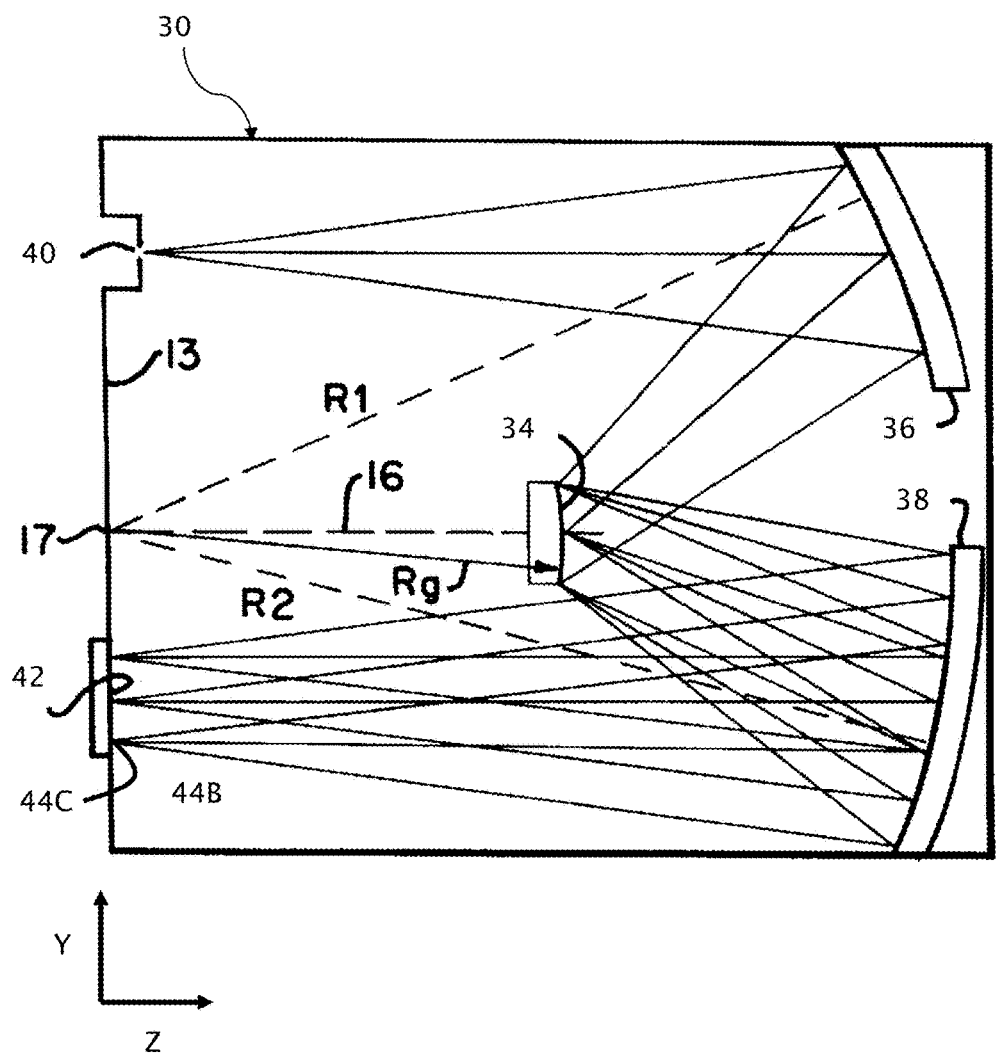
FIG. 2 is a diagrammatic side view of an imaging spectrometer taken along line 2-2 of FIG. 3.
Figure 3:
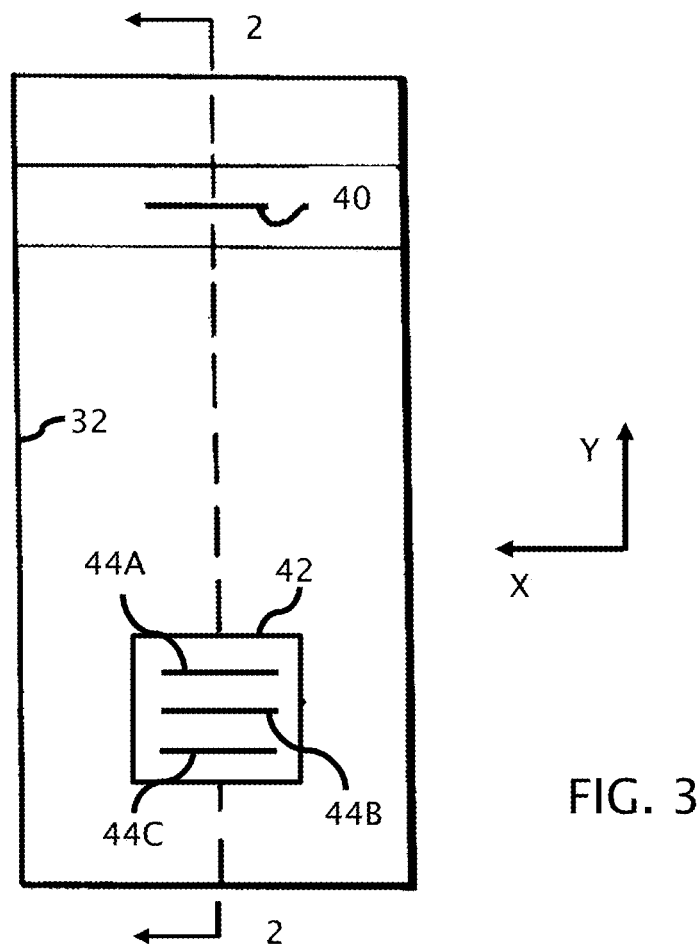
FIG. 3 is a diagrammatic end view of the imaging spectrometer in which a slit for admitting light is shown true length.

The design tool 10 can be used to improve the design of various dispersive optical systems, particularly imaging spectrometers using freeform optics to enhance performance. For example, FIGS. 2 and 3 depict a conventional Offner-Chrisp spectrometer 30 taken by way of example from the disclosure of U.S. Pat. No. 5,880,834 to Chrisp. The depicted spectrometer 30 in its original form includes within a housing 32 a spherical convex reflective diffraction grating 34 having a radius Rg and two concave spherical mirrors 36 and 38 having respective radii R1 and R2, which can be the same or different depending on the desired configuration. Radiation enters the spectrometer housing 32 through an entrance slit 40, shown true length in FIG. 3, and the concave mirror 36 receives an expanding beam of radiation from the entrance slit 40 and reflects the radiation in the form of a converging beam toward the grating 34, which diffracts the incident radiation for resolving the radiation into wavelength spectral components. The concave mirror 38 receives the diffracted wavelength radiation from grating G and reflects the diffracted radiation in the form of a converging beam onto a radiation detector 42 in a focal plane at which the entrance slit 40 is imaged.

As shown in FIG. 3, the entrance slit 40 extends a given length in the referenced X direction, which is preserved in the focal plane. However, the spatial dispersion of the radiation displaces the image of the entrance slit 40 in the Y direction as a function of wavelength. Three different wavelengths are represented in FIG. 2, resulting in the depicted displacement of entrance slit images 44A, 44B, and 44C, which are formed by the different wavelengths of radiation.

The spectrometer 30 typically operates in a so-called "pushbroom" capacity in which the spectrometer 30 moves in a direction substantially perpendicular to entrance slit 40 to scan an area of interest. For the remote sensing of objects, fore-optics (not shown) can be appended to the spectrometer to image successive sections of the object onto the entrance slit 40. The spectrometer 30 is envisioned as having a 200 nm to 1500 nm spectral bandwidth, a 10 mm entrance slit 40 length, a 100 nm/mm spectral dispersion at the image plane, and an F-number of 3.8.

Figures 4A, 4B:
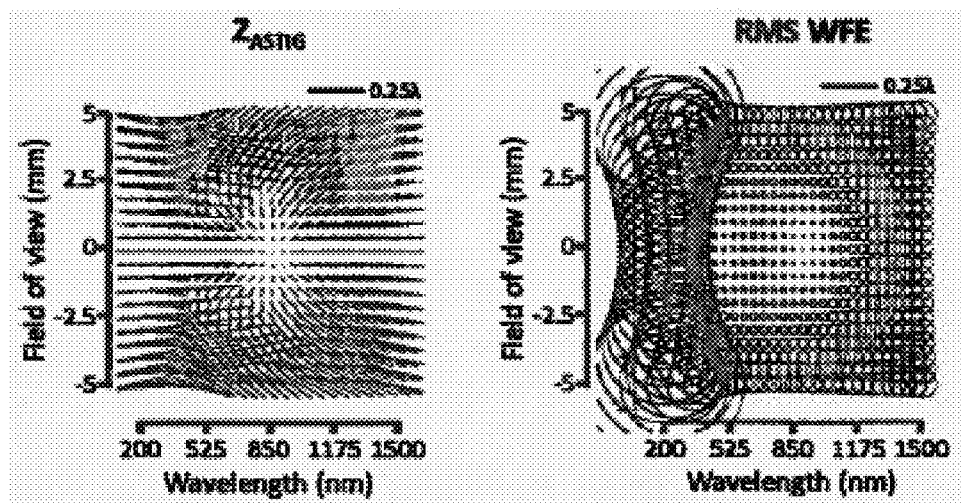
FIG. 4A is a spectral full-field display of local astigmatic magnitudes and orientations within an image field of the spectrometer according to a conventional design in which the image field is defined by an ordinate taken along a spatial length dimension of the spectrometer slit and an abscissa taken in an orthogonal direction of spectral dispersion.
FIG. 4B is a spectral full-field display of root mean square wavefront errors associated with calculated aberrations within the same spatially and spectrally defined image field of the conventionally designed spectrometer.

Conventional Offner-Chrisp spectrometers with spherical diffractive and reflective optics are known to be limited by astigmatism. FIGS. 4A and 4B, which are plotted with the design tool 10, provide for visualizing the astigmatic aberration and root mean square wavefront error (RMS WFE) of the conventionally designed spectrometer over the desired image field. The values for the astigmatic aberration and the wavefront error are plotted at grid points referenced to an ordinate along the spatial length dimension of the entrance slit 40 taken in millimeters (i.e., −5 mm to 5 mm) and to an abscissa in an orthogonal direction of spectral dispersion taken in nanometers of wavelength (i.e., 200 nm to 1500 nm). The astigmatic values, which are captured by ray tracing in an array of grid points within the image field, correspond for example to the expansion coefficients for the Zernike terms $Z_2^{-2}(\rho,\theta)=(\rho^2 \sin 2\theta)$ and $Z_2^{2}(\rho,\theta)=(\rho^2 \cos 2\theta)$. The magnitudes of the local astigmatic errors are represented by lines having lengths scaled in units of the local wavelength for which wavelength in the spectral band the aberration was calculated for and having an angular orientation corresponding to the direction of the astigmatic axis. The RMS WFE are depicted at corresponding grid points as circles having diameters also scaled in units of the local wavelength. As is apparent from FIGS. 4A and 4B, significant astigmatic and wavefront error exist for the conventional design. The maximum RMS WFE is depicted at 0.731λ and the average RMS WFE is 0.097λ.

Figure 5A:
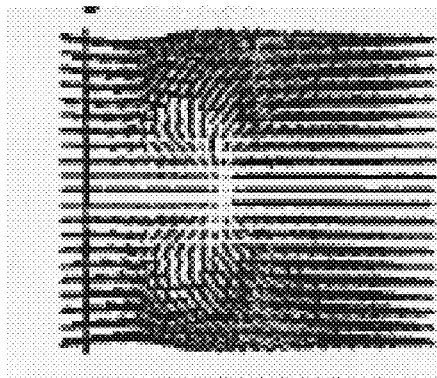
FIGS. 5A and 5B are spectral full-field displays corresponding to the respective plots of FIGS. 4A and 4B but representing the astigmatic and wavefront error results associated with a modified design of the spectrometer by substituting optimized aspheric surfaces for operative spherical surfaces of the conventional design.
Figure 5B:
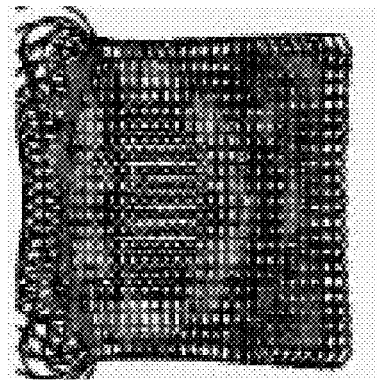

The plots of FIGS. 5A and 5B reflect the use of the design tool 10 to represent an optimization of the spectrometer design exploiting the use of aspheric surfaces for the convex reflective diffraction grating 34 and the two concave spherical mirrors 36 and 38. Although the plot axes are not reproduced in FIGS. 5A and 5B, the plots are taken over the same image field and at the same scale as the plots of FIGS. 4A and 4B with the plot of FIG. 5A presenting astigmatic values and orientations and the plot of FIG. 5B presenting root mean square (RMS) wavefront errors (WFE) at grid defined positions throughout the common image field. As depicted, the maximum RMS WFE is reduced to 0.427λ and the average RMS WFE is slightly reduced to 0.091λ.

Figure 6A:
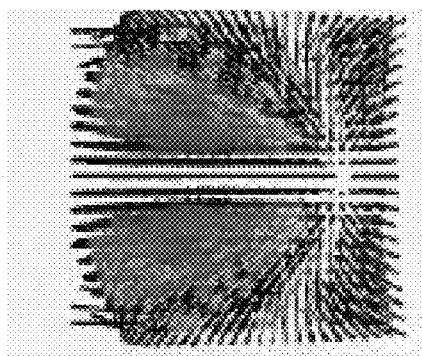
FIGS. 6A and 6B are spectral full-field displays corresponding to the respective plots of FIGS. 4A and 4B but representing the astigmatic and wavefront error results associated with a modified design of the spectrometer by incorporating an astigmatic node shift together with optimized aspheric surfaces in place of the operative spherical surfaces of the conventional design.
Figure 6B:
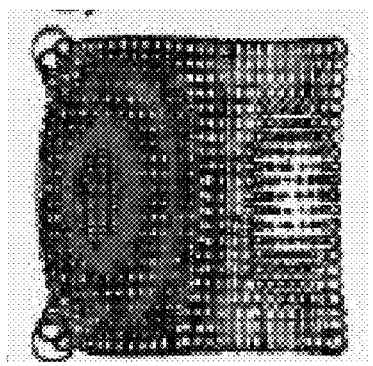

The similarly scaled plots of FIGS. 6A and 6B for astigmatic values and orientations and root mean square (RMS) wavefront errors (WFE) reflect the use of the design tool 10 to represent an optimization of the spectrometer design exploiting not only the use of aspheric surfaces for the convex reflective diffraction grating 34 and the two concave spherical mirrors 36 and 38 but also exploiting alignment possibilities for producing an astigmatic node shift (i.e., a shift in the point in the field with zero astigmatism). As so optimized, the full field displays of FIGS. 6A and 6B depict a further reduction in the maximum RMS WFE to 0.205λ but a slight worsening of the average RMS WFE to 0.096λ.

Figure 7A:
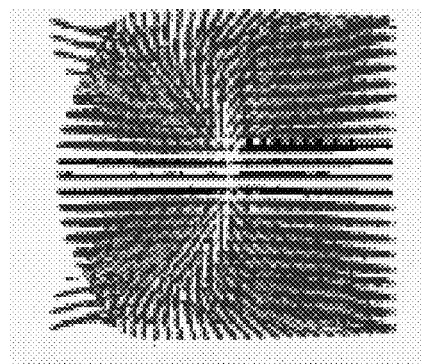
FIGS. 7A and 7B are spectral full-field displays corresponding to the respective plots of FIGS. 4A and 4B but representing the astigmatic and wavefront error results associated with a modified design of the spectrometer by substituting optimized anamorphic aspheric surfaces for the operative spherical surfaces of the conventional design.
Figure 7B:
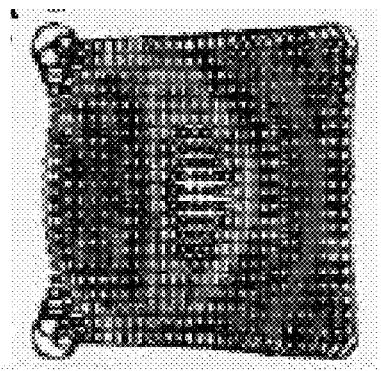

In FIGS. 7A and 7B, the similarly scaled plots of astigmatic values and orientations and root mean square (RMS) wavefront errors (WFE) reflect the use of the design tool 10 for exploiting the use of anamorphic aspheric surfaces among the convex reflective diffraction grating 34 and the two concave spherical mirrors 36 and 38. The anamorphic aspheric surfaces depart from radial symmetry in prescribed ways such as by exhibiting different basic curvatures or additional higher-order terms in two orthogonal directions and thereby allow for a further reduction in the maximum RMS WFE to 0.186λ while minimizing the average RMS WFE at 0.092λ.

Figures 8A, 8B:
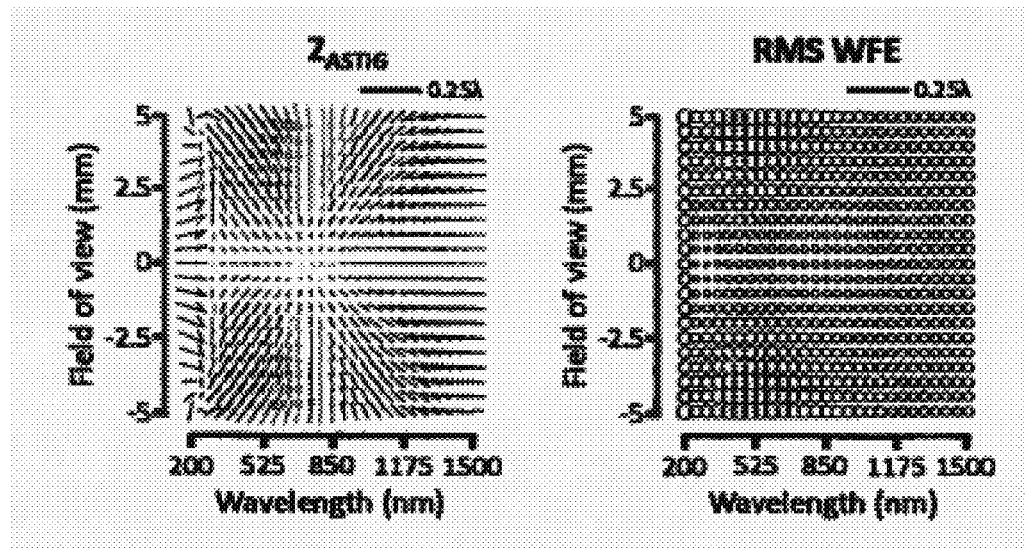
FIGS. 8A and 8B are spectral full-field displays corresponding to the respective plots of FIGS. 4A and 4B but representing the astigmatic and wavefront error results associated with a modified design of the spectrometer by substituting optimized freeform surfaces for the operative spherical surfaces of the conventional design.

FIGS. 8A and 8B demonstrate the use of the design tool 10 to represent yet a further optimization of the spectrometer design exploiting the use of freeform surfaces for the convex reflective diffraction grating 34 and the two concave spherical mirrors 36 and 38. Over the same image field scaled by a spatial field of view in one dimension along the slit 40 and by a spectral dimension also corresponding to a physical displacement in the focal plane of the detector 42, the plots of FIGS. 8A and 8B demonstrate a significant performance improvement made possible by the use of freeform surfaces. With all freeform surfaces, themselves here defined by Zernike type polynomials but not restricted to, the maximum RMS WFE is reduced to 0.063λ and the average RMS WFE is reduced to 0.041λ. The aspheric surface modifications to the spectrometer design did not demonstrate any particularly significant reduction of the average RMS WFE from the all spherical surface design, i.e., registering an approximately 5% improvement from 0.097λ to 0.092λ. However, the use of all freeform surfaces reduced the average RMS WFE by approximately 58% from 0.097λ to 0.041λ while also reducing the maximum RMS WFE by over 90% from 0.731λ to 0.063λ.

Figure 9:
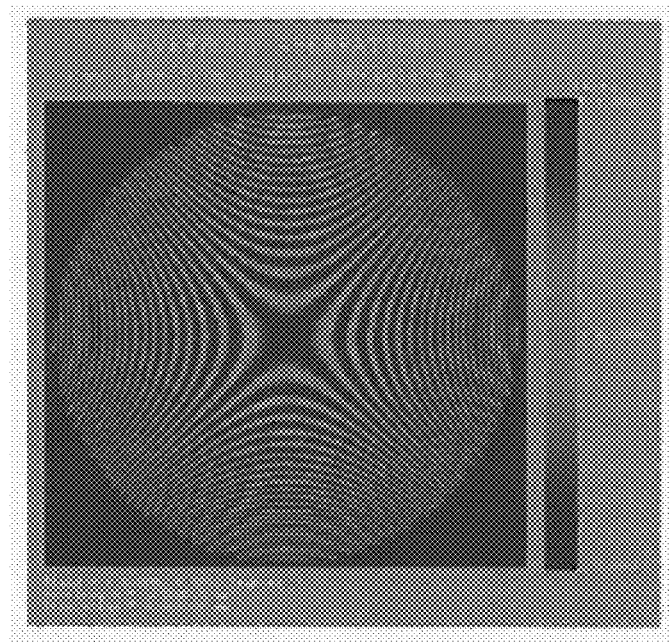
FIG. 9 is an interferogram depicting the freeform surface departure from its base sphere of the type used for the spectrometer design in FIGS. 8A and 8B dominated by astigmatism.

An example interferogram of a freeform surface departure is shown in FIG. 9 in which the departure from a sphere is dominated by astigmatism of less than 1000 microns (μm).

As demonstrated over the course of FIGS. 4A and 4B through FIGS. 8A and 8B, the design tool 10 provides for benchmarking the performance of design changes and options to achieve improved performance goals. In addition, the design tool 10 provides for ready interpretations of nodal aberration theory (NAT), which has been instrumental for visualizing freeform optical design space. That is, in rotationally nonsymmetric imaging systems, traditional aberrations such as coma and astigmatism, including higher orders, can develop a multi-nodal field dependence, where the aberration passes through a zero magnitude at different points in the field. Similar nodal behavior associated with rotationally nonsymmetric optics can be found in full fields displayed by a combination of spatial and spectral dimensions.

The design tool 10 allows aberrations to be compared to each other within a common field space to identify the dominant aberrations and to compare the effects of design changes to spectrally dispersive optical systems on individual aberrations, particularly the aberrations identified as being dominant.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A field display for spectrometers having optical system for imaging and spectrally dispersing an input over a plurality of spatially displaced positions in an image field comprising:
   a ray tracing module including a processor with a ray tracing algorithm arranged for modeling local aberrations throughout the image field of the spectrometer having a first spatial dimension corresponding to a length dimension of the input and a second spectral dimension corresponding to the dispersion of the input; and
   a display module with access to the processor, including a display driver for displaying information on a display, that converts values of the modeled local aberrations throughout the image field into representative symbols and plots the representative symbols in an array having a first axis corresponding to the first spatial dimension of the image field and a second axis corresponding to the second spectral dimension of the image field as a progression of local wavelengths,
   wherein the representative symbols are scaled in size in units of the local wavelengths.

2. The field display of claim 1 in which the values of the modeled local aberrations include calculated values for individual aberration terms.

3. The field display of claim 2 in which the calculated values for the individual aberration terms are represented as root mean square wavefront errors.

4. The field display of claim 1 in which the values of the modeled local aberrations include calculated values for a plurality of individual aberration terms as well as RMS wavefront errors, and the display module provides for plotting separate arrays of representative symbols for the calculated values of each of the individual aberration terms or RMS wavefront errors.

5. The field display of claim 2 in which the individual aberration terms include one or a pair of Zernike terms.

6. The field display of claim 2 in which the calculated values of at least one of the individual aberration terms include values for both magnitude and orientation of the modeled local aberrations.

7. The field display of claim 6 in which the representative symbols provide visual indications of both the magnitudes and orientations of the modeled local aberrations throughout the image field.

8. The field display of claim 7 in which the plots are accompanied by a scale bar for equating a size of the representative symbols to units of local wavelength.

9. The field display of claim 1 in which the spectrometer includes one or more rotationally nonsymmetric optical surface contributing to the imaging of the input.

10. The field display of claim 1 in which the ray tracing module provides for modeling multi-nodal aberrations throughout the image field of the spectrometer.

11. The field display of claim 1 in which the input has a slit field of view having a long dimension imaged along the first dimension of the image field and a narrow dimension subject to spectral dispersion along the second dimension of the image field.

12. A method of displaying aberrations in the image field of an optical system for imaging and spectrally dispersing an input over a plurality of spatially displaced positions in the image field comprising steps of:
   modeling local aberrations of the optical system throughout the image field having a first spatial dimension corresponding to a length dimension of the input and a second spectral dimension corresponding to the dispersion of the input;
   converting values of the modeled local aberrations throughout the image field into representative symbols; and
   plotting the representative symbols in an array having a first axis corresponding to the first spatial dimension of the image field and a second axis corresponding to the second spectral dimension of the image field as a progression of local wavelengths,
   wherein the representative symbols are scaled in size in units of the local wavelengths.

13. The method of claim 12 in which the step of modeling includes calculating values of one or more individual aberration terms at a plurality of positions throughout the image field.

14. The method of claim 13 in which the calculated values of at least one of the individual aberration terms include values for both magnitude and orientation of the modeled local aberrations.

15. The method of claim 14 in which the step of converting includes arranging the representative symbols to provide visual indications of both the magnitudes and orientations of the modeled local aberrations.

16. The method of claim 13 in which the step of plotting includes plotting a first set of the representative symbols based on the calculated values of a first of the individual aberration terms at the plurality of positions throughout the image field, and plotting a second set of the representative symbols based on the calculated values of a second of the individual aberration terms at the plurality of positions throughout the image field.

17. The method of claim 16 in which the calculated values for one of the individual aberration terms represents root mean square wavefront errors.

18. The method of claim 16 in which the individual aberration terms include at least two of defocus, astigmatism, coma, spherical aberration, and RMS wavefront error terms.

19. The method of claim 12 in which the step of modeling includes applying Zernike wavefront decomposition for estimating local aberrations throughout the image field.

20. The method of claim 19 in which the step of modeling includes modeling one or more rotationally nonsymmetric optical surfaces of the imaging system.

* * * * *